US007207034B2

United States Patent
Burke et al.

(10) Patent No.: US 7,207,034 B2
(45) Date of Patent: Apr. 17, 2007

(54) UNDO INFRASTRUCTURE

(75) Inventors: Shawn Patrick Burke, Kirkland, WA (US); Brian Keith Pepin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 10/602,435

(22) Filed: Jun. 23, 2003

(65) Prior Publication Data

US 2004/0268187 A1 Dec. 30, 2004

(51) Int. Cl.
*G06F 9/44* (2006.01)
*G06F 15/00* (2006.01)

(52) U.S. Cl. .................. 717/110; 717/110; 715/531; 715/540

(58) Field of Classification Search ................ 717/105, 717/110; 715/810, 531, 540
See application file for complete search history.

(56) References Cited

U.S. PATENT DOCUMENTS

| 5,481,710 | A |   | 1/1996 | Keane et al. ............... 395/700 |
| 6,108,668 | A |   | 8/2000 | Bates et al. ................ 707/203 |
| 6,111,575 | A | * | 8/2000 | Martinez et al. ............ 715/810 |
| 6,185,591 | B1 | * | 2/2001 | Baker et al. ................ 715/531 |
| 6,192,378 | B1 |   | 2/2001 | Abrams et al. ............. 707/204 |
| 6,523,134 | B2 | * | 2/2003 | Korenshtein ................ 714/16 |
| 2004/0225998 | A1 | * | 11/2004 | Van De Vanter et al. ... 717/113 |
| 2004/0261008 | A1 | * | 12/2004 | Pepin et al. ................ 715/500 |
| 2005/0005242 | A1 | * | 1/2005 | Hoyle ......................... 715/745 |

OTHER PUBLICATIONS

Chii Meng; Yasue, Motohiro; Imamiya, Atsumi; and Xiaoyang Mao; "Visualizing Histories for Selective Undo and Redo,"; Proceedings of the 3rd Asia Pacific Computer Human Interaction; Jul. 15-17, 1998; p. 459-64.
Min Zhang and Kehong Wang; "Implementing Undo/Redo in PDF Studio Using Object-Oriented Design Pattern,"; Proceedings of the 36th International Conference on Technology of Object-Oriented Languages and Systems (TOOLS-Asia 2000); Oct. 30 - Nov. 4, 2000; p. 58-64.
Lee, John ; Chan, Wai K.; and Sunwoo, J.S.; "The Sun Object for Open Nested Transactions,"; Proceedings of the 16th IASTED International Conference, Applied Informatics; Feb. 23-25, 1998; p. 402-4.

(Continued)

*Primary Examiner*—Tuan Dam
*Assistant Examiner*—Isaac Tecklu
(74) *Attorney, Agent, or Firm*—Workman Nydegger

(57) ABSTRACT

Methods, systems, and computer program products that automatically generate and track undo information so that the developer of a user interface object need not be responsible for generating and tracking undo information. Change notifications for changes to an object within a visual user interface designer are processed. Data representing an initial state of the object prior to the changes and data representing a subsequent state of the object after the changes is persisted. From the persisted data, an undo unit is prepared for undoing the changes to the object. The undo unit may comprise a transaction of multiple changes made to the object. Each undo unit may identify corresponding routines for undoing and redoing the actions included within the undo unit. An undo unit may be stored until an undo/redo notification is received, and then used to undo/redo the changes represented by the undo unit.

41 Claims, 7 Drawing Sheets

OTHER PUBLICATIONS

Stevens, Al; "Undo/Redo Redux,"; *Dr. Dobb's Journal*; Nov. 1998; vol. 23, No. 11; p. 119-20, 122, 124-5.

Chunbo Zhou and Imamiya, Atsumi; "Object-Based Nonlinear Undo Model,"; Proceedings of the 21st Annual International Computer Software and Applications Conference (COMPSAC'97); Aug. 13-15, 1997; p. 50-5.

Myers, Brad A.; McDaniel, Richard G.; Miller, Robert C.; Ferrency, Alan S.; Faulring, Andrew; Kyle, Bruce D.; Mickish, Andrew; Klimovitski, Alex; and Doane, Patrick; "The Amulet Environment: New Models for Effective User Interface Software Development,"; *IEEE Transacations on Software Engineering*; Jun. 1997; vol. 23, No. 6; p. 347-65.

Abowd, Gregory D. and Dix, Alan J.; "Giving Undo Attention,"; *Interacting with Computers*; Dec. 1992; vol. 4, No. 3; p. 317-42.

Van Camp, David; "An Unlimited Undo/Redo Stack Pattern for Powerbuilder,"; *Dr. Dobb's Journal*; Jun. 1997; vol. 22; No. 6; p. 78, 80, 82, 84, 86.

Chen, David and Chengzheng Sun; "Undoing any Operation in Collaborative Graphics Editing Systems,"; Group'01 Proceedings of the 2001 International ACM SIGGROUP Conference on Supporting Group Work; Sep. 30-Oct. 3, 2001; p. 197-206.

Edwards, W. Keith; Igarashi, Takeo; Lamarca, Anthony; and Mynatt, ELizabeth D.; "A Temporal Model for Multi-Level Undo and Redo,"; UIST Proceedings of the 13th Annual ACM Symposium on User Interface Software and Technology; Nov. 5-8, 2000; p. 31-40.

Beveridge, Jim; "Implementing Multilevel Undo/Redo,"; *Dr. Dobb's Journal*; Feb. 1996; vol. 21, No. 2; p. 64-6, 100, 102-4.

Berlage, Thomas and Genau, Andreas; "From Undo to Multi-User Applications,"; Vienna Conference VCHCI'93 Fin de Siecle, Human Computer Interaction; Sep. 20-22, 1993; p. 213-24.

Toriya, Hiroshi; Satoh, Toshiaki; Ueda, Kenji; and Chiyokura, Hiroaki; "Undo and Redo Operations for Solid Modeling,"; *IEEE Computer Graphics and Applications*; Apr. 1986; vol. 6, No. 4; p. 35-42.

Leeman, George B., Jr.; "Building Undo/Redo Operations into the C Programming Language,"; 15th Annual International Symposium on Fault-Tolerant Computing FTCS 15 Digest Papers; Jun. 19-21, 1985; p. 410-15.

Otto, Harald E.; "Undo, An Aid for Explorative Learning?"; *Journal of Computer Science and Technology* (English Language Edition); Jul. 1992; vol. 7; No. 3; p. 226-36.

Waldhor, Klemens; "Some Theses on Undo/Redo Commands,"; Proceedings of the 2nd IFIP Conference, Human-Computer Interaction—Interact'87; Sep. 1-4, 1987; p. 777-81.

Yiya Yang; "Undo Support Models,"; *International Journal of Man-Machine Studies*; May 1988; vol. 28, No. 5; p. 457-481.

Styne, Bruce A.; "Command History in a Reversible Painting System"; Computer Animation '90; Apr. 25-27, 1990; Geneva, Switzerland; p. 149-64.

* cited by examiner

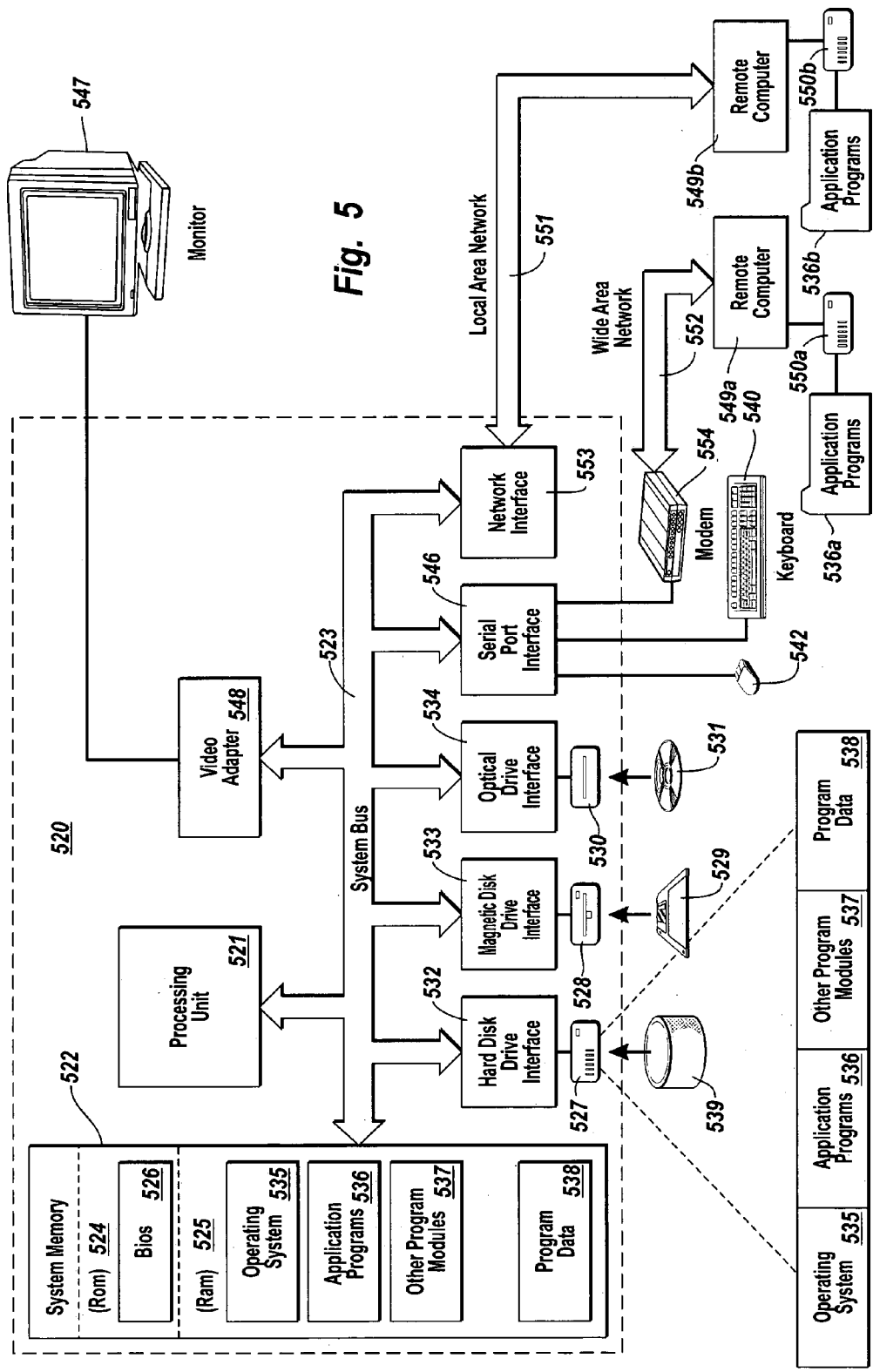

UNDO INFRASTRUCTURE

CROSS-REFERENCE TO RELATED APPLICATIONS

N/A

BACKGROUND OF THE INVENTION

1. The Field of the Invention

The present invention relates to an undo infrastructure. More particularly, the present invention relates to methods, systems, and computer program products that automatically generate and track undo information so that the developer of a user interface object need not be responsible for generating and tracking undo information.

2. Background and Related Art

Undo is a familiar feature of many applications. For example, spreadsheets and word processors typically allow data entry, such as adding new data, deleting existing data, cut and paste operations, and data formatting to be undone. Redo is undo's counterpart and in many circumstances is conceptually equivalent to undoing an undo operation. In some implementations, redo may allow the last operation to be repeated. In this application, undo may be used as a generic term encompassing both undo and redo operations.

Visual user interface designers are software that allow a developer to visually represent a user interface and automatically generate at least some of the corresponding source code from the visual representation. Implementing undo in a visual user interface designer presents some unique obstacles. For example, because many different types of objects may be used in a visual user interface designer, implementing undo generally is the responsibility of each object's developer. Many undo implementations operate in a similar fashion, using an "undo unit" to represent a single unit of undoable work. Once created, the undo units are added to a stack and the user is allowed to walk the stack to undo the actions represented by the corresponding undo units.

Frequently, undo units are designed as a toggle. That is, calling undo twice returns back to the beginning state prior to the first call. Due to the complexity of undo, applications generally need to be written from the ground up to support undo. Consider, for example, setting the Text property of a control as illustrated by the pseudo code shown in Table I.

TABLE I

```
textProp.SetValue(control, "Hello");
```

To make this action undoable, the action is encapsulated in an object, such as the one illustrated by the pseudo code shown in Table II.

TABLE II

```
Class TextPropUndoAction {
    string __newValue;
    Control __control;
    public TextPropUndoAction(Control control, string newValue) {
        __control = control;
        __newValue = newValue;
    }
    public void DoAction( ) {
        string oldValue = (string)textProp.GetValue(control);
        textProp.SetValue(control, __newValue);
```

TABLE II-continued

```
        __newValue = oldValue;
    }
}
```

Traditionally, a developer then makes use of the this class as shown by the pseudo code illustrated in Table III.

TABLE III

```
TextPropUndoAction a = new TextPropUndoAction(control, newValue);
a.DoAction( );
undoStack.Push(a);
```

While the implementation illustrated in Tables II and III works, it is easy for developers to break. Notice that TextPropUndoAction is fragile—the state of the control must be consistent if this object is going to correctly undo the action. For example, if there is a single piece of code somewhere that changed the control text property directly (i.e., not as shown in Table III, but simply as shown in Table I) TextPropUndoAction will break. This happens all too often practice, perhaps when an inexperienced programmer fails to consider how a particular change will impact undo. To further complicate the problem, if an undo action fails for some reason, implementing the correct fail semantics for each class can be a daunting task. Traditional undo implementations also are unable to provide undo support for third-party objects that do not implement undo, as shown for example, in Table II.

Accordingly, methods, systems, and computer program products that automatically generate and track undo information so that the developer of a user interface object need not be responsible for generating and tracking undo information, are desired.

BRIEF SUMMARY OF THE INVENTION

The present invention relates to methods, systems, and computer program products that automatically generate and track undo information so that the developer of a user interface object need not be responsible for generating and tracking undo information. In accordance with example implementations of the present invention, one or more change notifications for one or more changes to a user interface object within a visual user interface designer are processed. For example, change notifications may include adding or added notifications, removing or removed notifications, changing or changed notifications, a rename notification, etc. Both data representing an initial state of the user interface object prior to the one or more changes and data representing a subsequent state of the user interface object after the one or more changes is persisted. From the persisted data, an undo unit is prepared for undoing the one or more changes to the user interface object. In contrast, for conventional undo implementations, developers manually create undo units and must remember to create and store the undo units for all changes that may be made to an object.

The undo unit may comprise a transaction for a plurality of changes made to the user interface object. Each undo unit may identify corresponding routines for undoing and redoing the actions included within the undo unit. An undo unit may be stored, for example on a stack, until an undo or redo notification is received, and then used to undo or redo the changes represented by the undo unit. After being used, the undo unit is deleted, such as by removing it from the stack. Deleted undo units may be stored as redo units, and deleted redo unit may be stored as undo units.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 5 illustrates an example system that provides a suitable operating environment for the present invention.

DETAILED DESCRIPTION OF THE PREFERRED EMBODIMENTS

The present invention extends to methods, systems, and corresponding computer program products for automatically generating and tracking undo information so that a developer of a user interface object need not be responsible for generating and tracking the undo information. The embodiments of the present invention may comprise one or more special purpose and/or one or more general purpose computers including various computer hardware, as discussed in greater detail below.

Figure 1:
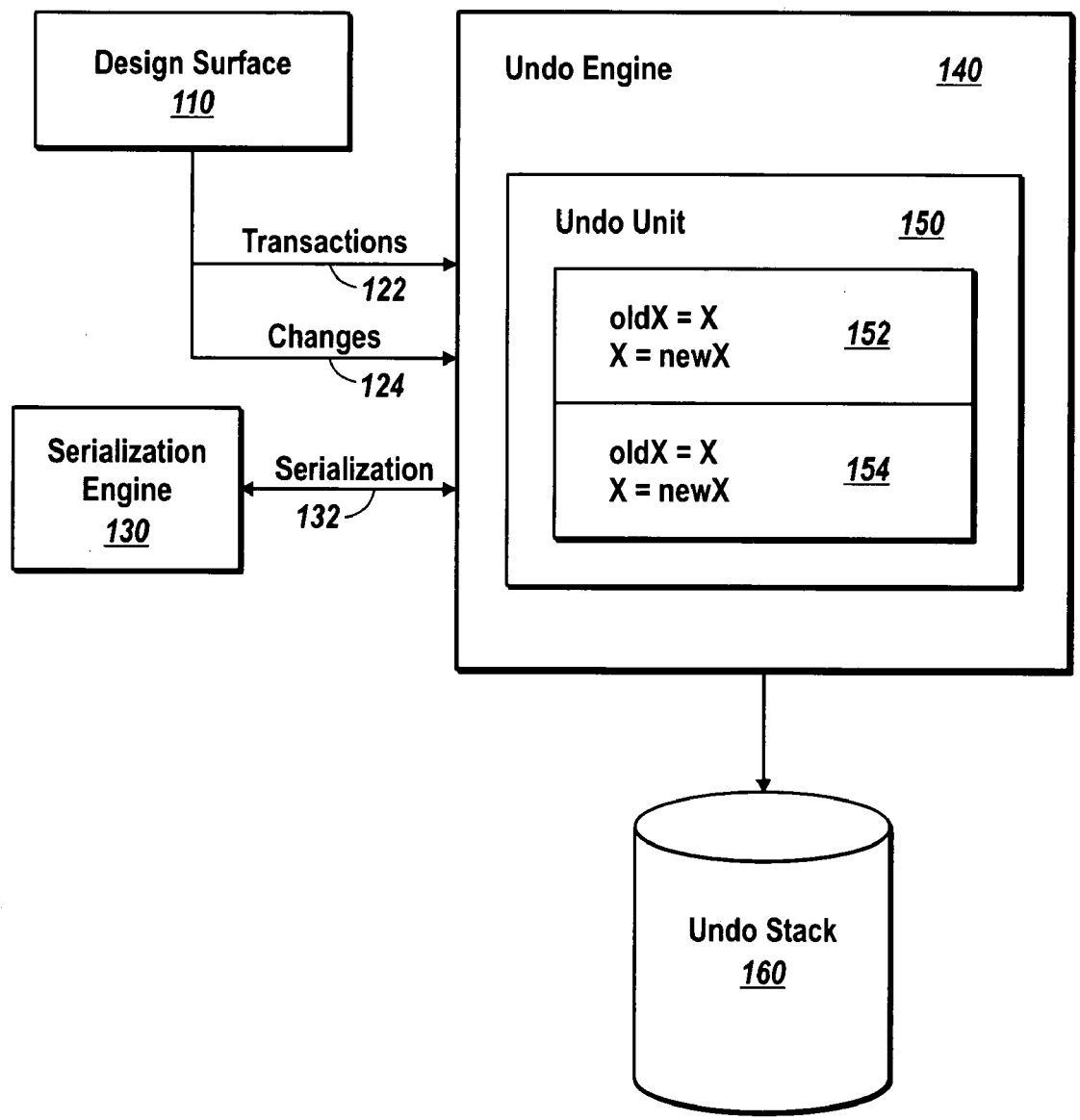
FIG. 1 illustrates an example embodiment of the present invention.

FIG. 1 illustrates an exemplary embodiment of the present invention. Unlike traditional undo implementations that require the developer to generate and track undo information for the developer's objects, undo engine 140 fabricates undo units for state changes that occur in the design surface 110 of a visual user interface designer. Therefore, developers using design surface 110 need not be responsible for generating and tracking undo information.

Undo engine 140 makes use of the following characteristics of objects running within design surface 110. First, objects of interest can be persisted to some format by the designer serializer. In other words, because the designer loader of design surface 110 reads and writes objects to disk, the designer loader is able to persist objects to some format. Second, objects within design surface 110 raise property change notifications when a property is changed. (See, for example, the discussion of designer hosts, below.) Third, a transaction can be used to fabricate an undo unit that spans multiple smaller actions and their related property change notifications. With these characteristics undo engine 140 can fabricate any undo units it needs automatically.

Undo engine 140 listens to change notifications 124 to create undo units. For the example implementation illustrated in FIG. 1, change notifications are generated by a change notification service that notifies undo engine 140 when changes are made to an object within design surface 110. The undo units themselves, such as undo unit 150, include a serialized object state produced by serialization engine 130. Serialization engine 130 is part of an overall serialization service that is used to save property and object values, both before and after a change is made to a component. A designer host is used to track transactions. (For example, because objects within design surface 110 are not necessarily live objects while they are being developed, a designer host surrounds an object to receive and process user input directed to the objects.) As a result, no code is needed to interact with the undo engine, and therefore, the developer code to create an undoable change to a control's text property may be illustrated in pseudo case as shown in Table IV, which identical to the pseudo code shown in Table I.

TABLE IV textProp.SetValue(control, "Hello");

Undo engine 140 handles everything else.

More complex interactions can be performed as well. Consider, for example, an algorithm to center a control. After calculating the X and Y locations to place the control, the layout algorithm could combine both property sets under a single undo action, as illustrated by the pseudo code shown in Table V.

TABLE IV

```
using (DesignerTransaction t = host.CreateTransaction("Center Control")) {
    PropertyDescriptorCollection props;
    props = TypeDescriptor.GetProperties(control);
    props["X"].SetValue(control, newX);
    props["Y"].SetValue(control, newY);
    t.Commit( );
}
```

The overall centering process proceeds as follows. When the option for centering the control is selected within design surface 110, a begin transaction notification 122 initiates a transaction, and a changing notification 124 is received indicating that the state of the object is about to change. In response to the transaction 122, undo engine 140 creates undo unit 150 and in response to changing notification 124 serializes 132 the object's unchanged state with serialization engine 130. Undo engine 140 stores the serialized object state within undo unit 150 (e.g., oldX and oldY in undo units 152 and 154). Once the algorithm finishes, a changed notification 124 indicates that the state of the object has changed and an end transaction notification 122 indicates the end of the transaction. In response to the changed notification 124, the undo engine 140 serializes 132 the object's changed state with serialization engine 130 and stores the serialized object state within undo unit 150 (e.g., X and Y in undo units 152 and 154). In response to the end transaction notification 122, undo engine 140 stores undo unit 150 on undo stack 160.

Undo engine 140 treats undo unit 150 as a toggle between an undo and redo state. Selecting undo restores the object to its position prior to selecting the center algorithm and deletes the undo unit from the undo stack 160. Because undo unit 150 contains sufficient information to redo the center operation, the undo unit 150 may be placed on a redo stack. Selecting redo causes the centering operation to be performed again, and deletes the undo unit (which is now a redo unit because it was on the redo stack) from the redo stack.

Serialization engine 130 is capable of performing two types of serialization. For adding and removing operations, serialization engine 130 creates a new component as expected. For property changes, however, serialization engine 130 simply serializes the changes necessary to represent the change. By avoiding creation of a new component when possible, the overhead of full component creation can be eliminated to improve the performance of the undo engine.

A pseudo code description of various classes and methods for an example implementation of undo engine 140 follows in Tables V and VI. The UndoEngine class, illustrated in Table V, is abstract so that it can be mated with an undo storage implementation, such as an undo stack, a serial engine implementation, and a user interface, such as a visual user interface designer.

TABLE V

```
namespace System.ComponentModel.Design
{
    public abstract class UndoEngine
    {
        public UndoEngine(IServiceProvider p);
        protected abstract void AddUndoUnit(UndoUnit unit);
        protected virtual UndoUnit CreateUndoUnit(
            string name, bool primary);
        protected virtual void DiscardUndoUnit(UndoUnit unit);
        public void Dispose( );
        protected virtual void Dispose(bool disposing);
        protected object GetRequiredService(Type serviceType);
        protected object GetService(Type serviceType);
        protected class UndoUnit {
        }
    }
}
```

Example methods and properties for the UndoEngine class are illustrated in the pseudo code shown in Table VI.

TABLE VI

```
UndoEngine Constructor
    public UndoEngine(IServiceProvider provider);
        Behavior      Creates a new UndoEngine.
        Parameters    System.IServiceProvider provider
                      A parenting service provider. UndoEngine needs several services
                      from this provider to be useful.
AddUndoUnit Method
    protected abstract void AddUndoUnit(UndoUnit unit);
        Behavior      Called to add the given unit to the undo stack.
        Parameters    System.ComponentModel.Design.UndoEngine.UndoUnit unit
                      The undo unit to add. This unit will have been previously created
                      by calling CreateUndoUnit.
CreateUndoUnit Method
    protected virtual UndoUnit CreateUndoUnit(string name, bool primary);
        Behavior      Creates a new undo unit. The default implementation just returns
                      a new instance of UndoUnit.
        Parameters    System.String name
                      The name of the unit to create. This will be the name that is
                      exposed to the user.
                      System.Boolean primary
                      Primary will be true when the first of a series of nested units is
                      being created. It will be false for any nested units. UndoEngine
                      does nothing with this parameter by default but some
                      implementations of undo (like those involving the COM
                      IOleParentUndoUnit design pattern) may need to determine the
                      difference between a primary unit and its children.
DiscardUndoUnit Method
    protected virtual void DiscardUndoUnit(UndoUnit unit);
        Behavior      Called when an undo unit is being discarded. Before this method
                      is called the undo unit is closed and then undone.
        Parameters    System.ComponentModel.Design.UndoEngine.UndoUnit unit
                      The unit to discard.
Dispose Method
    public void Dispose( );
    protected virtual void Dispose(bool disposing);
        Behavior      Disposes this object.
        Parameters    System.Boolean disposing
                      True if the object is being disposed, false if it is being finalized.
GetRequiredService Method
    protected object GetRequiredService(Type serviceType);
        Behavior      Returns the requested service. If this service is not available, this
                      method throws a NotSupportedException describing the missing
                      service.
        Parameters    System.Type serviceType
                      The type of service to retrieve.
GetService Method
    protected object GetService(Type serviceType);
        Behavior      Returns the requested service. If this service is not available, this
```

TABLE VI-continued

| | |
|---|---|
| Parameters | method returns null.<br>System.Type serviceType<br>The type of service to retrieve. |

The UndoUnit class, illustrated in Table VII, is a nested class within UndoEngine that encapsulates an undoable action. The default UndoUnit implementation listens to change notifications and builds up a list of events for each change. It saves these events using the serialization engine 130 and serialization service described above. UndoUnit receives event notifications for changes directly from UndoEngine through several public virtual methods. By exposing these methods developers can derive from UndoUnit and perform any additional logic they need. If desired, developers can completely bypass UndoUnit's implementation.

TABLE VII

```
namespace System.ComponentModel.Design
{
  public abstract class UndoEngine
  {
    protected class UndoUnit {
      public UndoUnit(UndoEngine engine, string name);
      public string Name { get; }
      public virtual bool IsEmpty { get; }
```

TABLE VII-continued

```
      protected UndoEngine UndoEngine { get; }
      public virtual void Close( );
      public virtual void ComponentAdded(ComponentEventArgs e);
      public virtual void ComponentAdding(ComponentEventArgs e);
      public virtual void ComponentChanged(
          ComponentChangedEventArgs e);
      public virtual void ComponentChanging(
          ComponentChangingEventArgs e);
      public virtual void ComponentRemoved(ComponentEventArgs e);
      public virtual void ComponentRemoving(ComponentEventArgs e);
      public virtual void ComponentRename(
      ComponentRenameEventArgs e);
      protected object GetService(Type serviceType);
      public void Undo( );
      protected virutal void UndoCore( );
    }
  }
}
```

Example methods and properties for the UndoUnit class are illustrated in the pseudo code shown in Table VIII.

TABLE VIII

| | |
|---|---|
| UndoUnit Constructor | |
| public UndoUnit(UndoEngine engine, string name); | |
| Behavior | Creates a new UndoUnit object. |
| Parameters | System.ComponentModel.Design.UndoEngine engine<br>The undo engine that owns this undo unit.<br>System.String name<br>A name for this unit. |
| Name Property | |
| public string Name { get; } | |
| Behavior | The name of this undo unit |
| IsEmpty Property | |
| public boolean IsEmpty { get; } | |
| Behavior | Returns true if this undo unit does not contain any events. The undo engine may discard empty units. |
| UndoEngine Property | |
| protected UndoEngine UndoEngine { get; } | |
| Behavior | Returns the undo engine passed into the constructor. |
| Close Method | |
| public virtual void Close( ); | |
| Behavior | Called by the undo engine to close this unit. When a unit is closed, no more events will come into its various event methods. The UndoUnit itself may take action here to ensure that any events that are currently open are closed. |
| ComponentAdded Method | |
| public virtual void ComponentAdded(ComponentEventArgs e) | |
| Behavior | This method is called by UndoEngine when the associated event is raised from IComponentChangeService. |
| ComponentAdding Method | |
| public virtual void ComponentAdding(ComponentEventArgs e); | |
| Behavior | This method is called by UndoEngine when the associated event is raised from IComponentChangeService. |
| ComponentChanged Method | |
| public virtual void ComponentChanged(ComponentChangedEventArgs e); | |
| Behavior | This method is called by UndoEngine when the associated event is raised from IComponentChangeService. |
| ComponentChanging Method | |
| public virtual void ComponentChanging(ComponentChangingEventArgs e); | |
| Behavior | This method is called by UndoEngine when the associated event is raised from IComponentChangeService. |

TABLE VIII-continued

ComponentRemoved Method
  public virtual void ComponentRemoved(ComponentEventArgs e);
    Behavior    This method is called by UndoEngine when the associated event is
                  raised from IComponentChangeService.
ComponentRemoving Method
  public virtual void ComponentRemoving(ComponentEventArgs e);
    Behavior    This method is called by UndoEngine when the associated event is
                  raised from IComponentChangeService.
ComponentRename Method
  public virtual void ComponentRename(ComponentRenameEventArgs e);
    Behavior    This method is called by UndoEngine when the associated event is
                  raised from IComponentChangeService.
GetService Method
  protected object GetService(Type serviceType);
    Behavior    Returns an instance of the given service, or null if the service could
                  not be resolved.
Undo Method
  public void Undo( );
    Behavior    This method is the public API for performing an undo action.
                  Undo actions toggle themselves between undo and redo states, so
                  calling Undo twice will set the object back to its original state.
UndoCore Method
  protected virtual void UndoCore( );
    Behavior    This method is responsible for performing the undo action. It is
                  called by the public Undo method. The Undo method itself works
                  to maintain consistent state within the UndoUnit object even in the
                  event of an exception thrown by UndoCore.

Figures 2A, 2B:
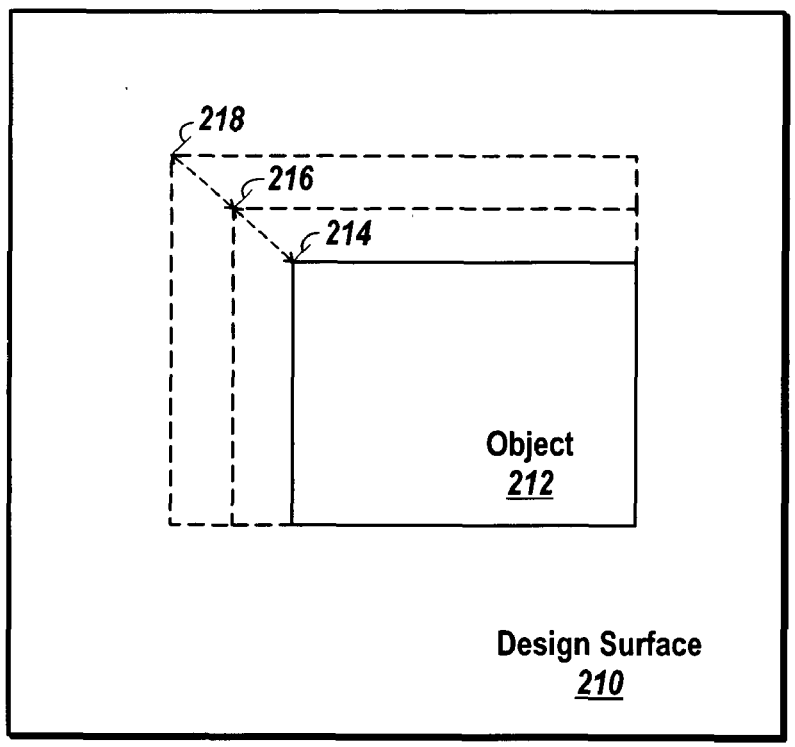
FIG. 2A–2B illustrate an example transaction of changes to an example user interface object and the corresponding undo unit.

FIGS. 2A and 2B illustrate an example transaction for a resize operation on an example user interface object 212 on design surface 210 and the corresponding undo unit 250, respectively. On a mouse down event on the upper left corner of user interface object 212, a begin transaction notification is sent from design surface 210 to the undo engine, followed by a changing notification. The begin transaction notification informs the undo engine that a series of changes should be captured within a single undo unit. The change notification informs the undo engine to persist the current property of object 212 because it is about to change.

Initially, user interface object 212 is located at position 214, which is reflected as a location 272 of (30,30) and a size 274 of (40,40) within the pre-change portion 270 of undo unit 250. Within design surface 210, the upper left corner of user interface object 212 is moved through position 216 to position 218. On the mouse up event, a changed notification followed by an end transaction notification is sent to the undo engine. The changed notification informs the undo engine to persist the changed property of object 212, and the end transaction notification closes the transaction. Note that moving the upper left corner of object 212, changes both the position and size of the object. Accordingly, a location 282 of (10,10) and a size 284 (60,60) are stored within post-change portion 280 of change unit 250. By grouping both the move—from location (30,30) to location (10,10)—and resize—from size (40,40) to size (60,60)—together, undo and redo perform both actions at once, which is most likely what a developer would expect, since from the perspective of the developer only one operation was performed.

Undo unit 250 also includes additional information, including object name 251, object type 252, and other information 253. This additional information is helpful in identifying the object that corresponds to the change unit. For example, when the object on which an operation is performed is deleted from the design surface then re-added through an undo, the additional information directs the undo or redo action to the appropriate object. Consider the case where an object is added, it's text property is modified—which generates two discrete undo actions—and then both actions are undone. In order to redo the text property change after the object has been recreated by the first redo, the undo unit should be able to locate the appropriate object even though the original one has been destroyed via the delete operation.

Figures 3A, 3B:
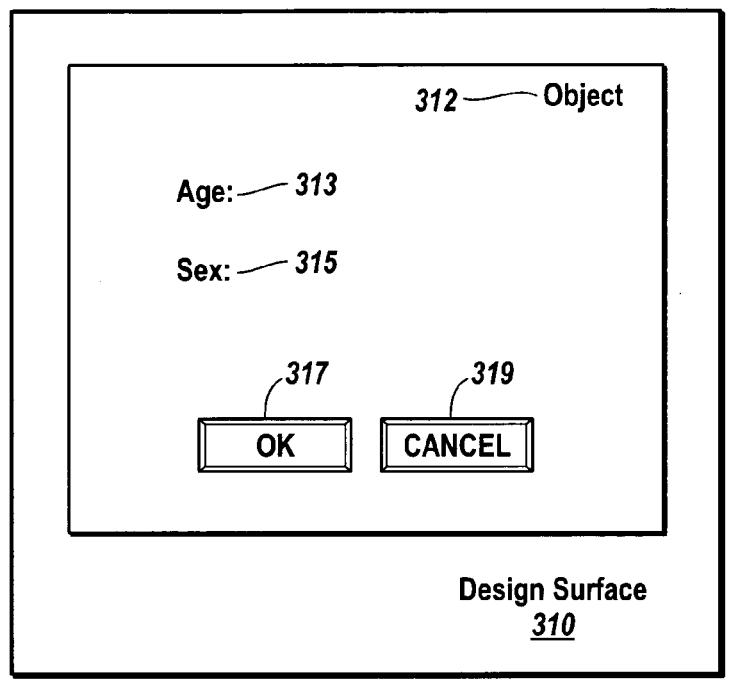
FIGS. 3A–3B illustrate an example transaction to a dialog user interface object and the corresponding undo unit.

FIGS. 3A and 3B illustrate an example transaction for a third-party dialog user interface object 312 on design surface 310 and the corresponding undo unit 350, respectively. Dialog user interface object 312 includes an age field 313, a sex field 315, an OK button 317, and a CANCEL button 319. Upon selection of sex field 315, a begin transaction notification is sent from design surface 310 to the undo engine, followed by a changing notification. As in FIGS. 2A–2B, the begin transaction notification informs the undo engine that a series of changes should be captured within a single undo unit. The change notification informs the undo engine to persist the current property of object 312 because it is about to change.

Initially, sex field 315 contains "M," which is reflected as a sex field 372 containing "M" within the pre-change portion 370 of undo unit 350. When focus leaves sex field 315 of dialog user interface object 312, a changed notification is sent to inform the undo engine to persist the changed sex property of object 312, which is reflected as a sex field 382 containing "F" within the post-change portion 380 of undo unit 350. Upon selection of age field 313, a changing notification is sent from design surface 310 to the undo engine to inform the undo engine to persist the age property because it is about to change. Initially the age field 374 contains "30," which is reflected as age field 374 containing "30" within the pre-change portion 370 of undo unit 350. When focus leaves age field 313, a changed notification is sent to inform the undo engine to persist the changed age property of object 312, which is reflected as an age field 384 containing "−5" within the post-change portion of undo unit 350.

Because validation of a field generally requires the field first receive a new value, "−5" is stored within undo unit 350. However, field validation may require the age field be corrected before the OK button may be selected and/or before the age field may lose focus. Accordingly, another changing notification may be sent to the undo engine, which records "30" in age filed 376 within the pre-change portion 370 of change unit 350. (The validation code may have changed the value back to "30" as part of the validation process.) Changing the age field 313 to a legal value of "5" generates a changed notification to inform the undo engine to persist the new value, which is reflected as age field 386 having a value of "5" in the post-change portion of undo unit 350. Note that similar to FIG. 2B, undo unit 350 also includes additional information, including object name 351, object type 352, and other information 353.

Because dialog user interface object 312 includes both an OK button 317 and a CANCEL button 319, the open transaction may not be completed. If CANCEL button 319 is selected, the transaction is simply rolled back, and undo unit 350 is not stored since there is nothing to undo after the roll back. If the OK button 317 is selected, and end transaction is send to the undo engine to close the transaction, and the undo unit 350 is stored, which allows for the changes within the dialog user interface object 312 to be undone/redone. When a dialog is closed, all changes are generally treated as a single transaction because most users think of the changes to the dialog as a single operation. Of course, while the dialog is open, individual changes could be stored as separate undo unit so that they could be undone or redone one change at a time. Depending on the complexity of a user interface object, transactions may be nested as appropriate. Note that this sophisticated undo functionality is available to third-party dialog user interface object 312, without the developer of the object having to implement the undo and redo functionality.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4A:
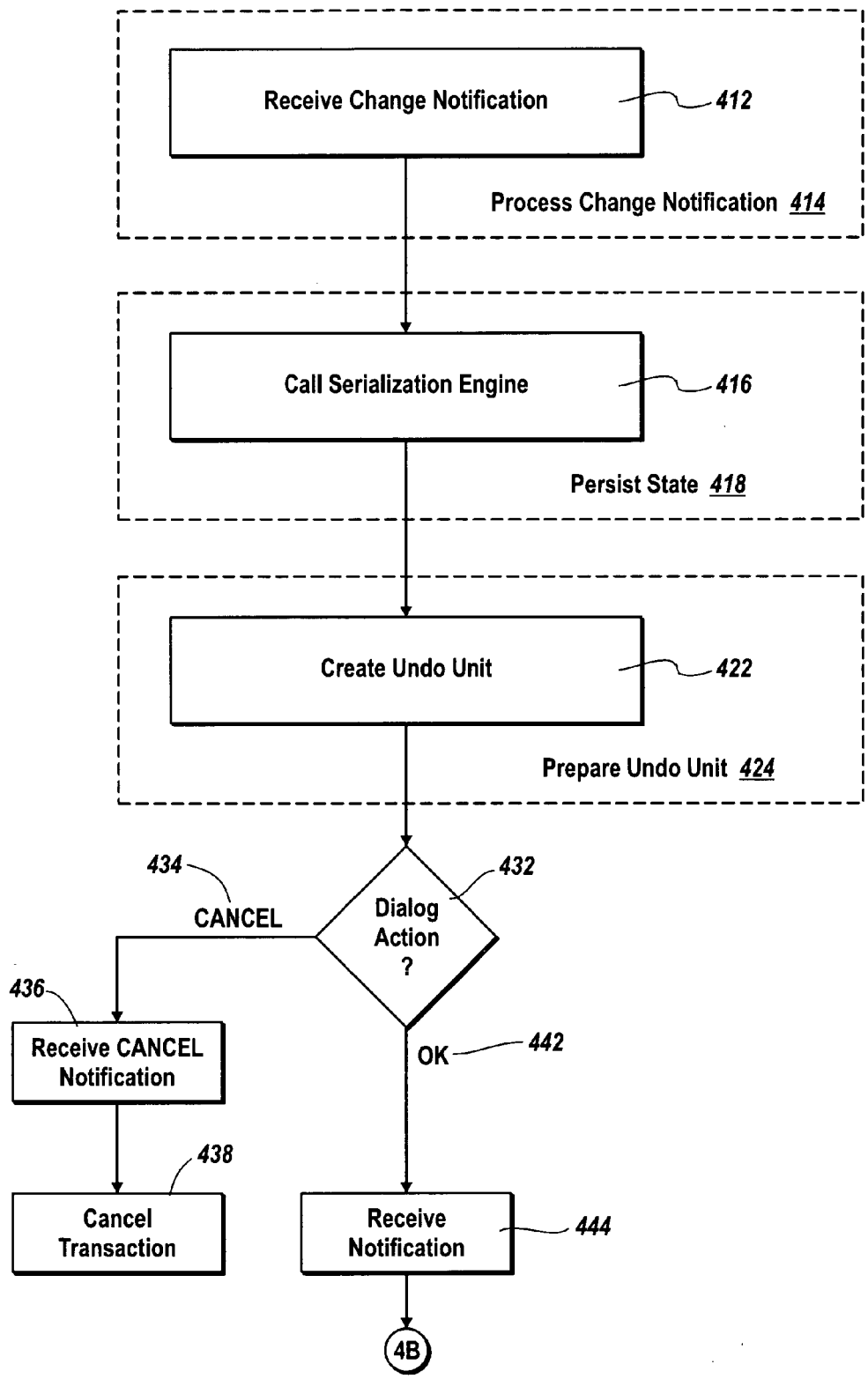
FIGS. 4A–4C show example acts and steps for methods of generating and tracking undo information in accordance with the present invention.
Figure 4B:
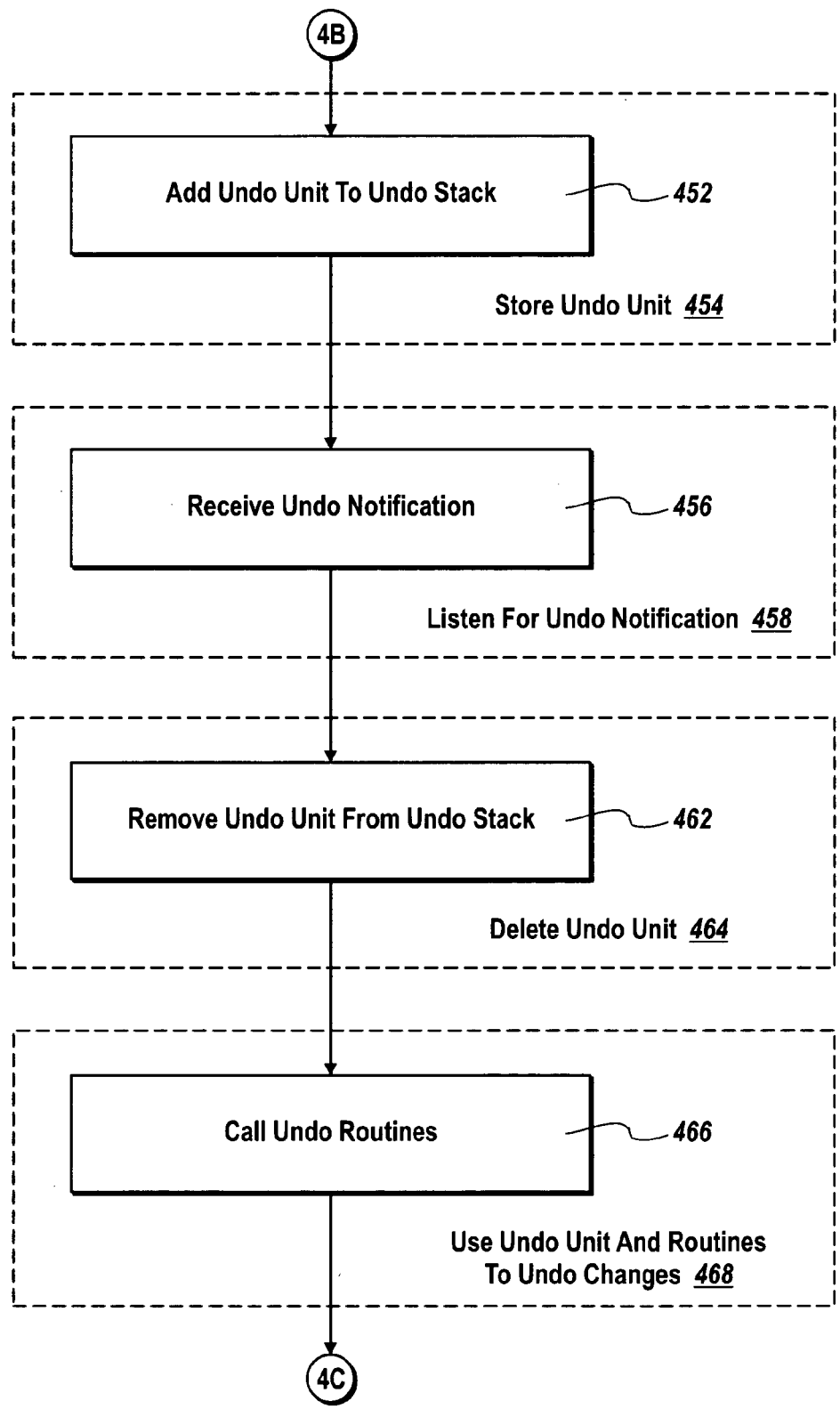
Figure 4C:
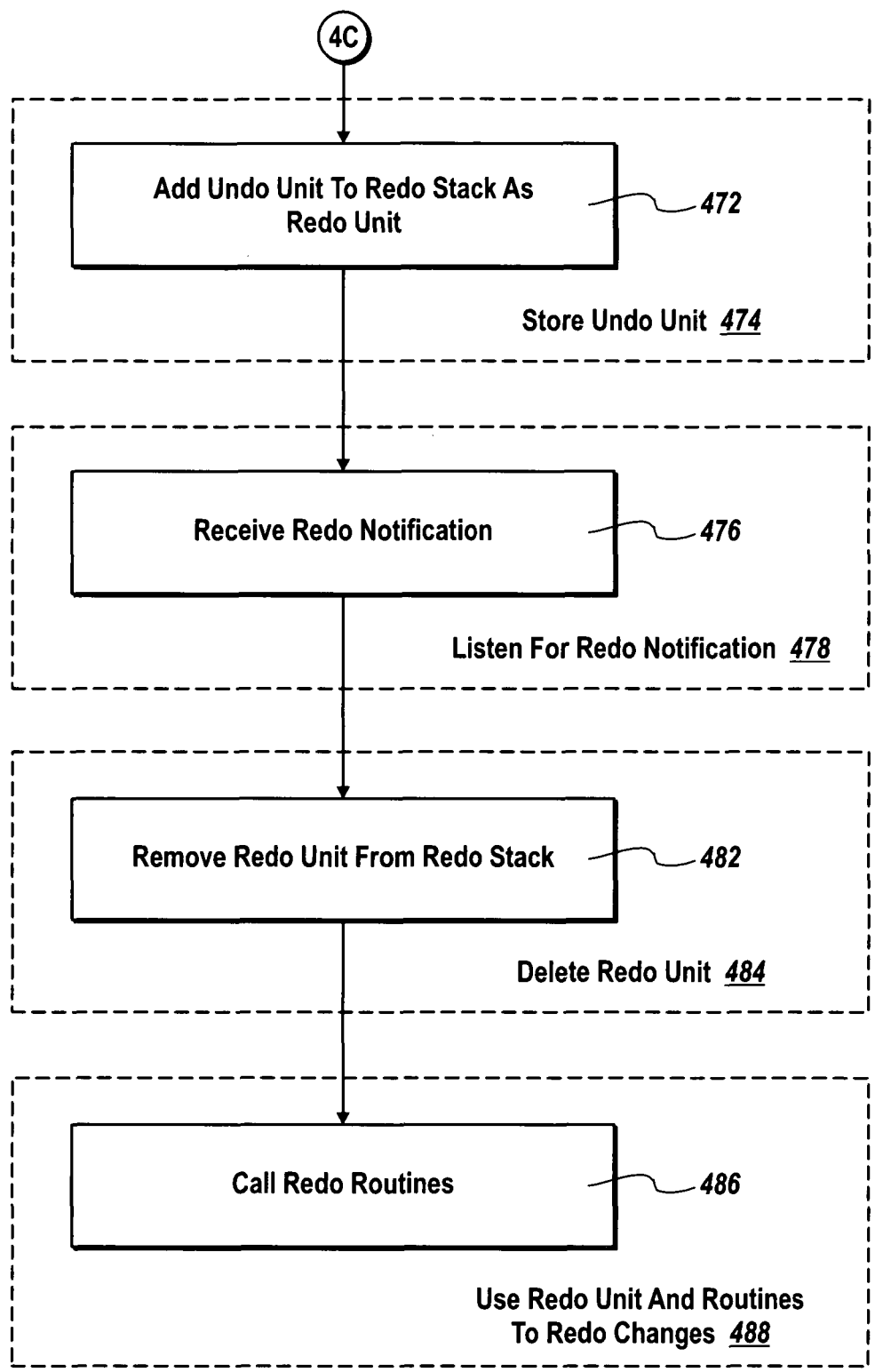

FIGS. 4A–4C show example acts and steps for methods of generating and tracking undo information in accordance with the present invention. A step for processing (414) one or more change notifications for one or more changes to a user interface object within a visual user interface designer may include an act of receiving (412) one or more change notifications that are generated in response to one or more changes to the user interface object. A step for persisting (418) initial data that represents an initial state of the user interface object prior to the one or more changes and subsequent data that represents a subsequent state of the user interface object after the one or more changes may include an act of (416) calling a serialization engine to serialize at least a portion of the user interface object into a serialized format that is suitable for representing the one or more changes.

A step for preparing (424) an undo unit from the initial data and subsequent data for undoing the one or more changes to the user interface object may include an act of creating (422) an undo unit from the serialized form of the one or more changes to the user interface object. For actions performed on a dialog, the method may include an act of receiving (436) a notification that a CANCEL button was selected (CANCEL branch 434 of decision block 432) and an act of canceling (438) the transaction. The method also may include an act of receiving (444) a notification that the OK button was selected (OK branch 442 of decision block 432).

A step for storing (454) the undo unit (OK button selected for a dialog or user interface object other than a dialog) may include an act of adding (452) the undo unit to an undo stack. A step for listening (458) for a notification to undo the one or more change in the undo unit may include an act of receiving (456) a notification to undo the one or more changes. A step for deleting (464) the undo unit may include an act of removing (462) the undo unit from the undo stack. A step for using (468) the undo unit and one or more undo routines to undo the one or more changes made to the user interface object may include an act of calling (466) the one or more routines for undoing the one or more changes.

A step for storing (474) the undo unit as a redo unit may include an act of adding (472) the undo unit to a redo stack as a redo unit. A step for listening (478) for a notification to redo the one or more changes in the redo unit may include an act of receiving (476) a notification to redo the one or more changes in the redo unit. An act of deleting (484) the redo unit may include an act of removing (482) the redo unit from the redo stack. A step for using (488) the redo unit and one or more redo routines to redo the one or more changes made to the user interface object may include an act of calling (486) the one or more routine for redoing the one or more changes made to the user interface object.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or-any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system that supports a visual user interface designer and a serialization engine capable of saving state for user interface objects created within the visual user interface designer, a method of automatically generating and tracking undo information for changes made to a user interface object within the visual user interface designer so that a developer of the user interface object need not be responsible for generating and tracking the undo information, the method comprising acts of:

receiving one or more change notifications generated in response to one or more changes to the user interface object within the visual user interface designer;

calling the serialization engine to serialize at least a portion of the user interface object into a serialized format that is suitable for representing the one or more changes;

using a transaction to fabricate an undo unit from the serialized format of the one or more changes to the user interface object, the transaction spanning the one or more changes and the one or more change notifications; and adding the undo unit to an undo stack such that the undo unit can subsequently be accessed to perform at least one of undoing and redoing any of the one or more changes.

2. A method as recited in claim 1, wherein the user interface object comprises a third-party user interface object for use within the visual user interface designer.

3. A method as recited in claim 1, wherein the one or more change notifications comprise at least one of an adding notification and an added notification.

4. A method as recited in claim 1, wherein the undo unit identifies one or more routines for undoing the one or more changes made to the user interface object.

5. A method as recited in claim 4, further comprising acts of:
receiving a notification to undo the one or more changes in the undo unit;
removing the undo unit from the undo stack; and
calling the one or more routines for undoing the one or more changes made to the user interface object.

6. A method as recited in claim 5, further comprising an act of adding the undo unit to a redo stack as a redo unit.

7. A method as recited in claim 6, wherein the undo unit identifies one or more routines for redoing the one or more changes made to the user interface object, the method further comprising acts of:
receiving a notification to redo the one or more changes in the redo unit;
removing the redo unit from the redo stack; and
calling the one or more routines for redoing the one or more changes made to the user interface object.

8. A method as recited in claim 1, wherein the undo unit comprises a name of the user interface object, a type of the user interface object, and one or more previous states of the user interface object prior to the one or more changes.

9. A computer program product for use at computer system that supports a visual user interface designer and a serialization engine capable of saving state for user interface objects created within the visual user interface designer, the computer program product comprising one or more computer readable media having stored thereon computer-executable instructions that, when executed at the computer system, cause the computer system to implement a method of automatically generating and tracking undo information for changes made to a user interface object within the visual user interface designer so that a developer of the user interface object need not be responsible for generating and tracking the undo information, including performing the following:
receiving one or more change notifications generated in response to one or more changes to the user interface object within the visual user interface designer;
calling the serialization engine to serialize at least a portion of the user interface object into a serialized format that is suitable for representing the one or more changes; and
using a transaction to fabricate an undo unit from the serialized format of the one or more changes to the user interface object, the transaction spanning the one or more changes and the one or more change notifications; and
adding the undo unit to an undo stack such that the undo unit can subsequently be accessed to perform at least one of undoing and redoing any of the one or more changes.

10. A computer program product as recited in claim 9, wherein at least one of the one or more change notifications initiates a transaction for multiple changes to be made to the user interface object.

11. A computer program product as recited in claim 9, wherein the one or more change notifications comprise at least one of a changing notification and a changed notification.

12. A computer program product as recited in claim 9, wherein the user interface object comprises a dialog with an OK button to accept any changes made within the dialog and a CANCEL button to reject any changes made within the dialog.

13. A computer program product as recited in 12, wherein at least one of the one or more change notifications initiates a transaction for changes to be made to the dialog.

14. A computer program product as recited in claim 13, the method further comprising acts of:
receiving a notification that the CANCEL button was selected; and
canceling the transaction.

15. A computer program product as recited in claim 13, the method further comprising acts of:
receiving a notification that the OK button was selected; and
adding the undo unit to an undue stack, wherein the undo unit comprises the transaction.

16. A computer program product as recited in claim 9, wherein the undo unit comprises a name of the user interface object, a type of the user interface object, and one or more subsequent states of the user interface object after the one or more changes.

17. A computer program product as recited in claim 9, wherein the user interface object does not implement undo for one or more properties of the user interface object.

18. In a computer system that supports a visual user interface designer and a serialization engine capable of saving state for user interface objects created within the visual user interface designer, a method of automatically generating and tracking undo information for changes made to a user interface object within the visual user interface designer so that a developer of the user interface object need not be responsible for generating and tracking the undo information, the method comprising steps for:
an undo engine processing one or more change notifications for one or more changes to the user interface object within the visual user interface designer;
the undo engine persisting initial data that represents an initial state of the user interface object prior to the one or more changes;
the undo engine persisting subsequent data that represents a subsequent state of the user interface object after the one or more changes; and
the undo engine using a transaction to fabricate an undo unit from the initial data and subsequent data for undoing the one or more changes to the user interface object, the transaction spanning the initial data and subsequent data.

19. A method as recited in claim 18, wherein the one or more change notifications comprise at least one of a removing notification and a removed notification.

20. A method as recited in claim 18, wherein the undo unit identifies one or more routines for undoing the one or more changes made to the user interface object.

21. A method as recited in claim 20, further comprising steps for:

storing the undo unit;
listening for a notification to undo the one or more changes in the undo unit;
using the undo unit and the one or more undo routines to undo the one or more changes made to the user interface object; and
deleting the undo unit.

22. A method as recited in claim 21, further comprising a step for storing the undo unit as a redo unit.

23. A method as recited in claim 22, wherein the redo unit comprises one or more routines for redoing the one or more changes made to the user interface object, the method further comprising steps for:
listening for a notification to redo the one or more changes in the redo unit;
using the redo unit and the one or more redo routines to redo the one or more changes made to the user interface object; and
deleting the redo unit.

24. A method as recited in claim 23, wherein the user interface object does not implement redo.

25. A method as recited in claim 23, wherein the step for the undo engine persisting initial data and persisting subsequent data comprises an act of calling the serialization engine to serialize at least a portion of the user interface object into a serialized format that is suitable for representing the one or more changes.

26. A computer program product for use at computer system that supports a visual user interface designer and a serialization engine capable of saving state for user interface objects created within the visual user interface designer, the computer program product comprising one or more computer readable media having stored thereon computer executable instructions that, when executed by a processor, cause an undo engine at the computer system implement a method of automatically generating and tracking undo information for changes made to a user interface object within the visual user interface designer so that a developer of the user interface object need not be responsible for generating and tracking the undo information, including performing the following:
processing one or more change notifications for one or more changes to the user interface object within the visual user interface designer;
persisting an initial data that represents an initial state of the user interface object prior to the one or more changes;
persisting a subsequent data that represents a subsequent state of the user interface object after the one or more changes; and
using a transaction to fabricate an undo unit from the initial data and subsequent data for undoing the one or more changes to the user interface object, the transaction spanning the initial data and the subsequent data.

27. A computer program product as recited in claim 26, wherein the undo unit comprises a transaction for a plurality of changes made to the user interface object.

28. A computer program product as recited in claim 26, wherein the one or more change notifications comprise a rename notification.

29. A computer program product as recited in claim 26, wherein the user interface object comprises a dialog with an OK button to accept any changes made within the dialog and a CANCEL button to reject any changes made within the dialog.

30. A computer program product as recited in claim 29, wherein at least one of the one or more change notifications initiates a transaction for changes to be made to the dialog.

31. A computer program product as recited in claim 30, the method further comprising acts of:
receiving a notification that the CANCEL button was selected; and
canceling the transaction.

32. A computer program product as recited in claim 30, the method further comprising acts of:
receiving a notification that the OK button was selected; and
adding the undo unit to an undue stack, wherein the undo unit comprises the transaction.

33. A computer program product as recited in claim 26, wherein the user interface object is a third-party user interface object for use within the visual user interface designer.

34. A computer program product as recited in claim 26, wherein the undo unit comprises a name of the user interface object, a type of the user interface object, one or more previous states of the user interface object prior to the one or more changes, and one or more subsequent states of the user interface object after the one or more changes.

35. A computer program product for use at a computer system, the computer program product comprising one or more computer readable media having stored thereon computer executable instructions comprising an undo engine that automatically generates and tracks undo information for changes made to a user interface object within a visual user interface designer so that a developer of the user interface object need not generate and track the undo information, the undo engine comprising:
one or more routines that capture change notifications that are generated automatically in response to changes made to the user interface object within the visual user interface designer;
one or more routines that request state data for the user interface object to use in representing one or more changes to the user interface object;
one or more routines that use a transaction to fabricate an undo unit from the state data that corresponds to the user interface object, the transactions spanning the changes made to the user interface object and the captured change notifications; and
one or more routines that request storage of the undo unit such that the undo unit can subsequently be accessed to perform at least one of undoing and redoing any of the changes made to the user interface object.

36. A computer program product as recited in claim 35, further comprising one or more routines for undoing the one or more changes made to the user interface object.

37. A computer program product as recited in claim 35, further comprising one or more routines for redoing the one or more changes made to the user interface object.

38. A computer program product as recited in claim 35, further comprising one or more routines for storing the undo unit.

39. A computer program product as recited in claim 35, further comprising one or more routines that generate the state data for the user interface object.

40. A computer program product as recited in claim 35, wherein the one or more routines that request state data for the user interface object are capable of interacting with a plurality of distinct state data implementations.

41. A computer program product as recited in claim 35, wherein the one or more routines that request storage of the undo unit are capable of interacting with a plurality of distinct storage implementations.

* * * * *